United States Patent Office 2,927,079
Patented Mar. 1, 1960

2,927,079

WATER-IN-OIL EMULSION LUBRICANTS

Willem Frederik Jense, Johan Leonard van der Minne, and Pieter Hendrik Jan Hermanie, Amsterdam, Netherlands, assignors to Shell Development Company, New York, N.Y., a corporation of Delaware No Drawing. Application December 16, 1955
Serial No. 553,667

Claims priority, application Netherlands
December 28, 1954

16 Claims. (Cl. 252—33.3)

This invention relates to water-in-oil lubricant emulsions. More particularly, it relates to stable water-in-oil lubricant emulsions which are useful in various industrial operations.

The stability of water-in-oil emulsions is governed by a number of factors such as the respective amounts of the two phases, the solubility and type of emulsifier used, temperature conditions and the like. When additional components are added to one or both phases in order to render the emulsion applicable to a particular industrial function such as corrosion inhibition and lubrication of marine engines or low speed diesel engines, lubrication in metal cutting, and the like, the factors governing stability of water-in-oil emulsions become more complex.

Emulsion lubricants, namely, oil-in-water and water-in-oil emulsions are finding wider applicability in the lubricating art. However, the utility of oil-in-water emulsions is restricted to uses where the function of the emulsion is primarily that of a coolant, whereas, in the case of water-in-oil emulsions their prime function is that of lubrication. In order to obtain the maximum benefits in both types of operations, the tendency has been to increase the amount of water in emulsions of the water-in-oil type so as to increase its cooling properties without depriving the emulsion of its lubricating properties.

The availability, cheapness, and multifunctional properties of polyvalent metal organic sulfonates make them one of the most desirable emulsifiers for water-in-oil emulsions. However, as the water content of such emulsions is increased, the amount of the emulsifier must also be increased to rather large amounts, namely, in the order of 10% to 30%. This causes secondary undesirable effects such as emulsion instability, phase separation, flocculation, formation of a third phase, gelation, and the like.

It has now been discovered that stable water-in-oil emulsions containing as much as 40% water, and which possess excellent lubricating properties, can be made by using an oil-soluble polyvalent metal organic sulfonate emulsifier in an amount not exceeding 0.5% by weight of polyvalent metal, calculated on the oil phase of the emulsion, and in addition, a minor amount, of from about 0.5% to about 5% by weight, calculated on the oil phase of the emulsion, of an alkyl phenol having a molecular weight range of from about 125 to about 1200, or wherein the alkyl group contains at least 2 alkyl carbon atoms. This additive combination produces unexpected results, particularly since it is known that alkyl phenols alone possess essentially no emulsifying properties; they are known essentially for their anti-oxidant properties. The use of this additive combination makes it possible to use a reduced amount of the polyvalent metal sulfonate, such as from 0.05% to 0.5% by weight of metal calculated on the oil phase. Furthermore, flocculation of any other additives dispersed in the emulsion as well as phase separation is minimized during storage or use.

The sulfonates can be neutral and/or basic oil-soluble polyvalent metal sulfonates derived from any suitable material and prepared by any of the well known suitable methods. Preferred materials for making oil-soluble sulfonates include petroleum fractions of the heavy gas oil and lubricating oil boiling range, or synthetic alkyl substituted aromatic compounds. The petroleum sulfonates suitable for use in compositions of this invention are described in United States Patents 2,361,804, 2,480,-638, 2,485,861, 2,509,863, 2,501,731, and 2,585,520. If desired, the sulfonates can be purified by the methods described in United States Patents 2,441,258 and 2,488,721. Aromatic sulfonates which are useful in compositions of this invention include those described in United States Patents 2,411,583, 2,418,894, 2,442,915, 2,556,108, and 2,556,848. Although various polyvalent metal sulfonates are contemplated in the practice of the invention, including alkaline earth metal organic sulfonates and other polyvalent metal organic sulfonates, particularly other divalent metal organic sulfonates and trivalent metal organic sulfonates, the sulfonates of the metals of group II of the periodic table and having an atomic number from 12 to 56 are preferred, and especially the alkaline earth metals within that group of metals. Specific sulfonates which are particularly suitable for use in compositions of this invention include oil-soluble metal sulfonates such as Ca, Ba, Mg, and Zn petroleum sulfonates derived from petroleum sulfonic acids having a molecular weight of from about 350 to about 900, diwaxbenzene sulfonate, stearylbenzene sulfonate, diwaxnaphthalene sulfonate, tetra-tertiary butyl-naphthalene sulfonate, and mixtures thereof. By basic salts is meant that the amount of neutralizing agent used to neutralize the acid is far in excess (30–500%) of what normally is required to neutralize the acid (sulfonic acid) to produce the normal salt.

Within the scope of the present invention the term "phenol" comprises not only mononuclear aromatic compounds having one or more phenolic hydroxyl groups, but also polynuclear aromatic compounds having one or more phenolic hydroxyl groups, i.e., hydroxyl groups directly attached to a nuclear carbon atom. The nuclei in the polynuclear compounds may be condensed, as in the naphthols, or bound to each other through one or more aliphatic carbon atoms, as is the case in alkylphenolaldehyde condensation products.

The alkyl phenols may comprise one or more alkyl groups per aromatic ring system (single ring or condensed rings); in most cases the number of alkyl groups is from 1 to 3. Preferred alkyl phenols are those in which the alkyl groups together contain from about 10 to about 20 carbon atoms per aromatic ring system, with no more than about 40 per molecule. This group, therefore, includes naphthols of which the alkyl groups together have 10 or more carbon atoms per molecule. However, alkyl phenols wherein the alkyl groups contain a total of less than 10 carbon atoms but at least 2 carbon atoms produce an improvement in the stability of the present emulsions.

Suitable particular alkylphenols which are useful in compositions of the invention include mono-alkyl phenols such as the o-, m-, and p-butyl, octyl, and dodecyl phenols and mixtures of alkyl-phenols which are obtained by alkylating phenol with mixtures of alkenes having, for example 10–18 or 14–18 carbon atoms; dialkyl phenols such as the 2,4-, 2,3-, 3,4-, 2,6-, 2,5-, and 3,5-dialkyl phenols, for instance 2,4-diamylphenol, 2-tertiarybutyl-4-methylphenol, 2-tertiarybutyl-6- methylphenol, 2-tertiarybutyl-3-methylphenol, 2-tertiarybutyl-6-isopropyl phenol; trialkyl phenols such as the 2,4,6-trialkylphenols as illustrated by 2,4-dimethyl-6-tertiarybutylphenol, 2,4-dimethyl-6-tertiary octylphenol 4-methyl-2,6-ditertiarybutylphenol, and 4,6-ditertiarybutyl-2-isopropyl phenol; alkyl dihydroxy benzenes such as dibutyl resorcinol; alkyl polynuclear phenols such as 2-idecyl-d-naphthols and mixtures of alkyl naphthols obtained by alkylating naphthol with mixtures of alkenes having, for example, 10 to 18 or 14 to 18 carbon atoms.

Another class of effective alkylphenols is that of polyphenols such as poly(alkylhydroxyphenyl)alkanes. These are illustrated by the alkylene bis(alkylphenols), such as 2,2'-methylene bis(4,6-dietertiarybutylphenol) and 2,2'-methylene bis(4-methyl-6-tertiarybutylphenol), which are preparable from the corresponding alkylphenols and formaldehyde. In addition to these di(alkylhydroxyphenyl)alkanes, higher condensation products, the poly(alkylhydroxyphenyl)polyalkanes, containing up to an average of about 5–6 alkylphenol units connected through 4–5 alkane (alkylene), such as methylene, radicals, are particularly effective. Thus, the condensation product of about five octylphenol molecules with four formaldehyde molecules, which may be named penta(octylhydroxyphenyl)tetramethane, is a very effective alkylphenol for the practice of the invention.

Generally, the proportion of the alkylphenol used is from about 0.5% to about 5% by weight, calculated on the oil phase. It is necessary to use at least 0.5% by weight, and the amount should not be over about 5%. At intermediate concentrations, the efficacy of the individual alkylphenol depends somewhat on its molecular weight. For instance, the octylphenol-formaldehyde condensation product having a molecular weight of about 1000 exhibits maximum effectiveness at a concentration of about 0.5%, whereas a simple alkylphenol having a molecular weight of about 125 gave optimum results at about 4% by weight concentration. With the lower molecular weight alkylphenols such as 2,6-dimethyl phenol, o-amylphenol, or 2,4-diamylphenol amounts of from 2 to 5% calculated on the oil phase, are preferred whereas with higher molecular weight alkylphenols such as octyl phenol-formaldehyde condensation products having a molecular weight of about 1000 and containing about 40 alkyl carbon atoms per molecule, smaller amounts of from 0.5% to 1.5% are preferred. By low molecular weight alkylphenols is meant phenols having a molecular weight of from about 125 to about 450 and high molecular weight alkylphenols is meant to include alkyl phenols having a molecular weight of 600 and higher such as between about 700 and 1200.

The viscosity of the oil component of the present emulsions may vary within wide limits and lies especially between 20 centistokes at 50° C. and 1200 centistokes at 100° C. The oil component can be either a mineral or synthetic lubricating oil or a fatty oil. Mixtures of various types of oils are also suitable as the oil component of the present emulsions. Both petroleum residual oils and distillate oils may be used. The synthetic lubricating oils may be either of the hydrocarbon type, e.g., the polymerizate or alkylate type, or of another type. The usual lubricating oil additives such as pour point depressants, viscosity index improvers, extreme pressure dopes, anti-oxidants, anti-foaming agents, detergents, and anti-wear agents may also be present in the oil phase.

The use of the described combination of a polyvalent metal sulfonate with an alkyl phenol is not only effective in the preparation of water-in-oil emulsion lubricants, the aqueous phase of which is pure or practically pure water, but also in the preparation of water-in-oil emulsion lubricants, the aqueous phase of which contains dissolved water-soluble divalent metal salts having anti-wear properties. Water-in-oil emulsion lubricants, the aqueous phase of which contains a water-soluble alkaline earth metal salts in an amount sufficient to inhibit wear generally ranging from about 0.25 to 2.5 gram mols per liter, are especially suitable for the lubrication of internal combustion engines, particularly diesel engines, which are run on fuels having sulphur contents of at least 0.01% by weight, and particularly from about 0.1% to about 5% by weight, calculated as elemental sulphur. Examples of suitable anti-wear salts are the formates, acetates, propionates, nitrites, and nitrates of the alkaline earth metals such as calcium, barium, magnesium, and zinc. Salts of aromatic carboxylic acids, e.g., calcium or barium salicylate, come also into consideration.

The water-in-oil emulsions can be prepared by various known procedures. In general the preparation is best carried out by dissolving the polyvalent metal sulphonate and the alkyl phenol in the oil, after which the aqueous phase is added and the mixture is stirred, if desired followed by a further homogenizing treatment, which may, for instance, be carried out by passing the emulsion through a gear pump. By means of such homogenizing treatment the average size of the dispersed particles in the emulsion may be considerably reduced, e.g., to an average size of 2 microns or less.

The invention is illustrated by the following examples:

Composition A

Basic calcium petroleum sulfonate --- 0.1% by wt. of Ca, calculated on the oil phase.
2,6-dimethylphenol --- 4% by wt. calculated on the oil phase.

dispersed in 70 parts by weight of mineral lubricating oil (viscosity 68 cs. at 50° C.) was emulsified with 30 parts of a 23% by weight water solution of chemically pure calcium acetate.

Composition B

Basic calcium petroleum sulfonate --- 0.1% by wt. of Ca calculated on the oil phase.
Ortho-amylphenol --- 4% by wt. calculated on the oil phase.

dispersed in 70 parts by weight of mineral lubricating oil (viscosity 68 cs. at 50° C.) was emulsified with 30 parts of a 23% by weight water solution of chemically pure calcium acetate.

Composition C

Basic calcium petroleum sulfonate --- 0.1% by wt. of Ca calculated on the oil phase.
2,4-diamylphenol --- 2% by wt. calculated on the oil phase.

dispersed in 70 parts by weight of mineral lubricating oil (viscosity 68 cs. at 50° C.) was emulsified with 30 parts of a 23% by weight water solution of chemically pure calcium acetate.

Composition D

Basic calcium petroleum sulfonate --- 0.1% by wt. of Ca calculated on the oil phase.
$C_{10}$–$C_{18}$ alkyl phenol --- 4% by wt. calculated on the oil phase.

dispersed in 70 parts by weight of mineral lubricating oil (viscosity 68 cs. at 50° C.) was emulsified with 30 parts of a 23% by weight water solution of chemically pure calcium acetate.

Composition E

Basic calcium petroleum sulfonate --- 0.1% by wt. of Ca calculated on the oil phase.
$C_{10}$–$C_{18}$ alkyl phenol --- 2% by wt. calculated on the oil phase.

dispersed in 70 parts by weight of mineral lubricating oil (viscosity 68 cs. at 50° C.) was emulsified with 30 parts of a 23% by weight water solution of chemically pure calcium acetate.

Composition F

Basic calcium petroleum sulfonate --- 0.1% by wt. of Ca calculated on the oil phase.
$C_{10}$–$C_{18}$ alkyl naphthol --- 4% by wt. calculated on the oil phase.

dispersed in 70 parts by weight of mineral lubricating oil (viscosity 68 cs. at 50° C.) was emulsified with 30 parts of a 23% by weight water solution of chemically pure calcium acetate.

Composition G

| | |
|---|---|
| Basic calcium petroleum sulfonate | 0.1% by wt. of Ca calculated on the oil phase. |
| $C_{10}$-$C_{18}$ alkyl naphthol | 2% by wt. calculated on the oil phase. | dispersed in 70 parts by weight of mineral lubricating oil (viscosity 68 cs. at 50° C.) was emulsified with 30 parts of a 23% by weight water solution of chemically pure calcium acetate.

Composition H

| | |
|---|---|
| Basic calcium petroleum sulfonate | 0.1% by wt. of Ca calculated on the oil phase. |
| p-Octyl phenol-formaldehyde condensation product (M.W. 1000). | 0.5% by wt. calculated on the oil phase. | dispersed in 70 parts by weight of mineral lubricating oil (viscosity 68 cs. at 50° C.) was emulsified with 30 parts of 23% by weight water solution of chemically pure calcium acetate.

Other corresponding compositions of A through H type, but in which the calcium acetate is substituted by other water-soluble alkaline earth metal salts such as calcium, barium, or magnesium nitrite, nitrate, sulphate, formate, acetate, or salicylate, are suitable stable water-in-oil lubricants which are effective in the lubrication of engines operating on high sulphur fuels.

Still other examples of compositions of this invention include water-in-oil emulsions comprising 20 to 40 parts of water by weight and 80 to 60 parts by weight of oil having dispersed therein from 0.05% to 0.5% by weight, calculated on the metal portion of the oil-soluble polyvalent metal salt, of calcium, barium, magnesium, zinc, or cadmium petroleum sulfonate, and from 0.5% to 5% by weight of 4-tertiary butyl phenol, 2,6-dimethylphenol, 2,6-ditertiarybutyl-4-methyl phenol, 2,2'-methylene bis (4-methyl-6-tertiarybutylphenol), 2,2'-methylene bis(4,6-ditertiarybutyl phenol) and mixtures thereof. The values given for both of the additives are based on the oil phase of the emulsion.

The stability of the emulsions was determined by (I) storing the emulsion at 20° C. in a closed stoppered bottle containing 10 cm. of the emulsion and examining it after 1, 10 and 30 days, respectively, and (II) by storing 50 cc. emulsion in a closed glass cylinder at 50° C. and observing the emulsion daily.

In tests I and II Compositions A through H were stable and no phase separation or flocculation was observed. When emulsions of the above type A through H were prepared but in which in each case the phenol was omitted and then tested by test I procedure flocculation was noted after 1 day and after 10 days, one third of the emulsion settled out. In test II when the same modified compositions were tested (Compositions A through H but in which the phenol in each case was omitted) flocculation was noted after 1 day, and after 1 day, 3 cc. of oil separated; after 2 days, 4 cc. of oil separated; after 4 days, 6 cc. of oil separated; and after 7 days, 7½ cc. of oil separated.

Compositions of this invention as described in column 5, lines 20–39, are also stable and possess good lubricating properties.

Water-in-oil emulsions of this invention, in addition to being stable, can be used as bases for cutting fluids, corrosion inhibiting compositions, steam cylinder lubricants, and base lubricants for various marine installations.

We claim as our invention:

1. A stable water-in-mineral oil emulsion lubricant comprising from 20 to 40 parts of water as the dispersed phase and from 80 to 60 parts of mineral oil as the continuous phase, said emulsion containing dispersed essentially in the oil phase (1) an oil-soluble alkaline earth metal organic sulfonate in an amount of from about 0.05% to about 0.5% by weight of the metal, calculated on the oil phase, and (2) from about 2% to about 5% by weight, calculated on the oil phase, of an alkyl phenol containing from 2 to 40 alkyl carbon atoms so as to prevent phase separation and flocculation.

2. A stable water-in-mineral oil emulsion lubricant comprising from 20 to 40 parts of water as the dispersed phase and from 80 to 60 parts mineral oil as the continuous phase, said emulsion containing dispersed essentially in the oil phase, an alkaline earth metal petroleum sulfonate in an amount of from about 0.05% to about 0.5% by weight of the metal, and from about 2% to about 5% by weight of an alkyl phenol containing from 2 to 40 alkyl carbon atoms so as to prevent phase separation and flocculation.

3. A stable water-in-mineral oil emulsion lubricant comprising from 20 to 40 parts of water as the dispersed phase and from 80 to 60 parts mineral oil as the continuous phase said emulsion containing dispersed essentially in the oil phase, calcium petroleum sulfonate in an amount of from about 0.05% to about 0.5% by weight of calcium, and from about 2% to about 5% by weight of an alkyl phenol containing from 2 to 40 alkyl carbon atoms so as to prevent phase separation and flocculation.

4. A stable water-in-mineral oil emulsion lubricant comprising from 20 to 40 parts of water as the dispersed phase and from 80 to 60 parts mineral oil as the continuous phase said emulsion containing dispersed essentially in the oil phase basic calcium petroleum sulfonate in an amount of from about 0.05% to about 0.5% by weight of calcium, and from about 2% to about 5% by weight of an alkyl phenol containing from 2 to 40 alkyl carbon atoms so as to prevent phase separation and flocculation.

5. A stable water-in-mineral oil emulsion lubricant comprising about 30 parts of water as the dispersed phase and about 70 parts mineral oil as the continuous phase said emulsion containing dispersed essentially in the oil phase, basic calcium petroleum sulfonate in an amount from about 0.05% to about 0.5% by weight of calcium, and from about 2% to about 5% by weight of 2,6-dimethyl phenol so as to prevent phase separation and flocculation.

6. A stable water-in-mineral oil emulsion lubricant comprising about 30 parts of water as the dispersed phase and about 70 parts mineral oil as the continuous phase said emulsion containing dispersed essentially in the oil phase, basic calcium petroleum sulfonate in an amount of from about 0.05% to about 0.5% by weight of calcium and from about 2% to about 5% by weight of ortho-amylphenol so as to prevent phase separation and flocculation.

7. A stable water-in-mineral oil emulsion lubricant comprising about 30 parts of water as the dispersed phase and about 70 parts mineral oil as the continuous phase said emulsion containing dispersed essentially in the oil phase, basic calcium petroleum sulfonate in an amount of from about 0.05% to about 0.5% by weight of calcium and from about 2% to about 5% by weight of 2,4-diamyl phenol so as to prevent phase separation and flocculation.

8. A stable water-in-mineral oil emulsion lubricant comprising about 30 parts of water as the dispersed phase and about 70 parts mineral oil as the continuous phase said emulsion containing dispersed essentially in the oil phase, basic calcium petroleum sulfonate in an amount of from about 0.05% to about 0.5% by weight of calcium and from about 2% to about 5% by weight of $C_{10}$-$C_{18}$ alkyl phenol so as to prevent phase separation and flocculation.

9. A stable water-in-mineral oil emulsion lubricant comprising about 30 parts of water as the dispersed phase and about 70 parts mineral oil as the continuous phase said emulsion containing dispersed essentially in the oil phase, basic calcium petroleum sulfonate in an amount of from about 0.05% to about 0.5% by weight of calcium and from about 2% to about 5% by weight of p-octylphenol-formaldehyde condensation product so as to prevent phase separation and flocculation.

10. The composition of claim 1 having incorporated in the water phase from 0.5 to 2.5 grams mols per liter of a water-soluble divalent metal salt.

11. The composition of claim 4 having incorporated in the water phase from 0.5 to 2.5 grams mols per liter of a water-soluble alkaline earth metal salt.

12. The composition of claim 5 having incorporated in the water phase about a 23% solution of calcium acetate.

13. The composition of claim 6 having incorporated in the water phase about a 23% solution of calcium acetate.

14. The composition of claim 7 having incorporated in the water phase about a 23% solution of calcium acetate.

15. The composition of claim 9 having incorporated in the water phase about a 23% solution of calcium nitrite.

16. The composition of claim 9 having incorporated in the water phase about a 23% solution of calcium acetate.

References Cited in the file of this patent
UNITED STATES PATENTS

| | | |
|---|---|---|
| 2,250,188 | Wilson | July 22, 1941 |
| 2,298,660 | Stevens et al. | Oct. 13, 1942 |
| 2,320,263 | Carlson et al. | May 25, 1943 |
| 2,356,254 | Lehmann et al. | Aug. 22, 1944 |
| 2,730,498 | Fortess et al. | Jan. 10, 1956 |
| 2,744,870 | Stillebroer et al. | May 8, 1956 |
| 2,750,340 | Gerhardt et al. | June 12, 1956 |

FOREIGN PATENTS

| | | |
|---|---|---|
| 786,596 | Great Britain | Nov. 20, 1957 |